United States Patent
Park et al.

(10) Patent No.: US 8,599,350 B2
(45) Date of Patent: Dec. 3, 2013

(54) DISPLAY PANEL AND METHOD OF MANUFACTURING THE SAME

(75) Inventors: Jae Hong Park, Hwaseong-si (KR); Suk Choi, Seongnam-si (KR); Ohjeong Kwon, Hwaseong-si (KR); Hyelim Jang, Yongin-si (KR); Sung-Jae Yun, Hwaseong-si (KR); Hyeokjin Lee, Seongnam-si (KR); Yong Woon Lim, Seoul (KR); Heeseop Kim, Hwaseong-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 242 days.

(21) Appl. No.: 13/172,948

(22) Filed: Jun. 30, 2011

(65) Prior Publication Data

US 2012/0026421 A1     Feb. 2, 2012

(30) Foreign Application Priority Data

Jul. 27, 2010 (KR) .................. 10-2010-0072440

(51) Int. Cl.
    *G02F 1/1333*     (2006.01)
(52) U.S. Cl.
    USPC .............................. 349/142; 349/93; 349/141
(58) Field of Classification Search
    USPC ................................................. 349/141–142
    See application file for complete search history.

(56) References Cited

U.S. PATENT DOCUMENTS

2006/0203169 A1 *   9/2006   Ozawa et al. ................ 349/141
2009/0161042 A1     6/2009   Inoue et al.

OTHER PUBLICATIONS

Ho Hyun Lee, et al., "Fast Electro-Optic Device Controlled by Dielectric Response of Planarly Aligned Cholesteric Liquid Crystals," Journal of Applied Physics 106, 014503 (2009), pp. 106, 014503-1 to 014503-5.

* cited by examiner

*Primary Examiner* — Phu Vu
(74) *Attorney, Agent, or Firm* — F. Chau & Associates, LLC

(57) ABSTRACT

A display panel includes a first substrate and a second substrate facing the first substrate. The second substrate includes a first electrode and a second electrode spaced apart from each other. A cholesteric liquid crystal having a pitch shorter than a wavelength of a visible ray and a rotation axis substantially perpendicular to the first and second substrates is disposed between the first and second substrates. The display panel displays a grayscale image in response to an electric field generated between the first and second electrodes. A polymer is added to the cholesteric liquid crystal, and a concentration of the polymer is controlled by exposing the polymer to a light. The concentration of the polymer in an area adjacent to the first substrate may be higher than the concentration of the polymer in an area adjacent to the second substrate.

22 Claims, 17 Drawing Sheets

DISPLAY PANEL AND METHOD OF MANUFACTURING THE SAME

CROSS-REFERENCE TO RELATED APPLICATION

This application claims priority under 35 U.S.C. §119 to Korean Patent Application No. 10-2010-0072440 filed on Jul. 27, 2010, the disclosure of which is incorporated by reference herein in its entirety.

BACKGROUND

1. Technical Field

The present invention relates to a display panel including a cholesteric liquid crystal having a low driving voltage and improved display characteristics, and a method of manufacturing the display panel.

2. Discussion of the Related Art

In general, a liquid crystal display includes a first substrate, a second substrate, and a liquid crystal layer disposed between the first and second substrates.

The liquid crystal layer may include cholesteric liquid crystals. A cholesteric liquid crystal has three different alignment directions. The alignment directions are based on the intensity of an electric field applied to the liquid crystal layer. Cholesteric liquid crystals have generally been employed in reflective type displays. Recently, however, it has been determined that shortening the pitch of the cholesteric liquid crystals may control birefringence resulting from the intensity of the electric field. As a result, cholesteric liquid crystals may also be employed in transmissive type displays.

However, employing cholesteric liquid crystals having a short pitch in transmissive type displays may result in a high driving voltage, a narrow viewing angle, and a low alignment stability.

SUMMARY OF THE INVENTION

Exemplary embodiments of the present invention provide a display panel including a cholesteric liquid crystal with improved display quality and a low driving voltage.

Exemplary embodiments of the present invention also provide a method of manufacturing the display panel.

According to an exemplary embodiment, a method of manufacturing a display panel includes forming a cholesteric liquid crystal between a first substrate and a second substrate. The second substrate includes first and second electrodes spaced apart from each other, and the cholesteric liquid crystal has a pitch shorter than a wavelength of a visible ray and a rotation axis substantially perpendicular to the first and second substrates. An electric field is generated between the first and second electrodes. A polymer is added to the cholesteric liquid crystal. A concentration of the polymer in the cholesteric liquid crystal is controlled by exposing the polymer to a light.

In an exemplary embodiment, a concentration of the polymer is lower in an area adjacent to the second substrate than the concentration of the polymer in an area adjacent to the first substrate.

According to an exemplary embodiment, a display panel includes a first substrate, a second substrate, and a liquid crystal layer. The second substrate faces the first substrate and includes a first electrode and a second electrode. The first and second electrodes are spaced apart from each other, and an electric field is generated between the first and second electrodes. The liquid crystal layer includes a cholesteric liquid crystal and a polymer. The liquid crystal layer is disposed between the first and second substrates, and the cholesteric liquid crystal has a pitch shorter than a wavelength of a visible ray and a rotation axis that is substantially perpendicular to the first and second substrates. A concentration of the polymer in an area adjacent to the first substrate is different from a concentration of the polymer in an area adjacent to the second substrate.

In an exemplary embodiment, the concentration of the polymer is lower in an area adjacent to the second substrate than the concentration of the polymer in an area adjacent to the first substrate.

According to an exemplary embodiment, the display panel includes a cholesteric liquid crystal having a pitch shorter than the wavelength of a visible ray, and is driven by a horizontal electric field. Thus, the driving voltage of the display is lowered, and the viewing angle and the contrast ratio of the display may be improved.

According to an exemplary embodiment, a method of manufacturing a display panel includes forming a liquid crystal layer between a first substrate and a second substrate, adding a polymer to the liquid crystal layer, and increasing a concentration of the polymer in an area adjacent to the first substrate and decreasing a concentration of the polymer in an area adjacent to the second substrate, by increasing a voltage applied between first and second electrodes. The first and second electrodes are spaced apart from each other and are located on the second substrate, and the liquid crystal layer includes cholesteric liquid crystals.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Figure 1A:
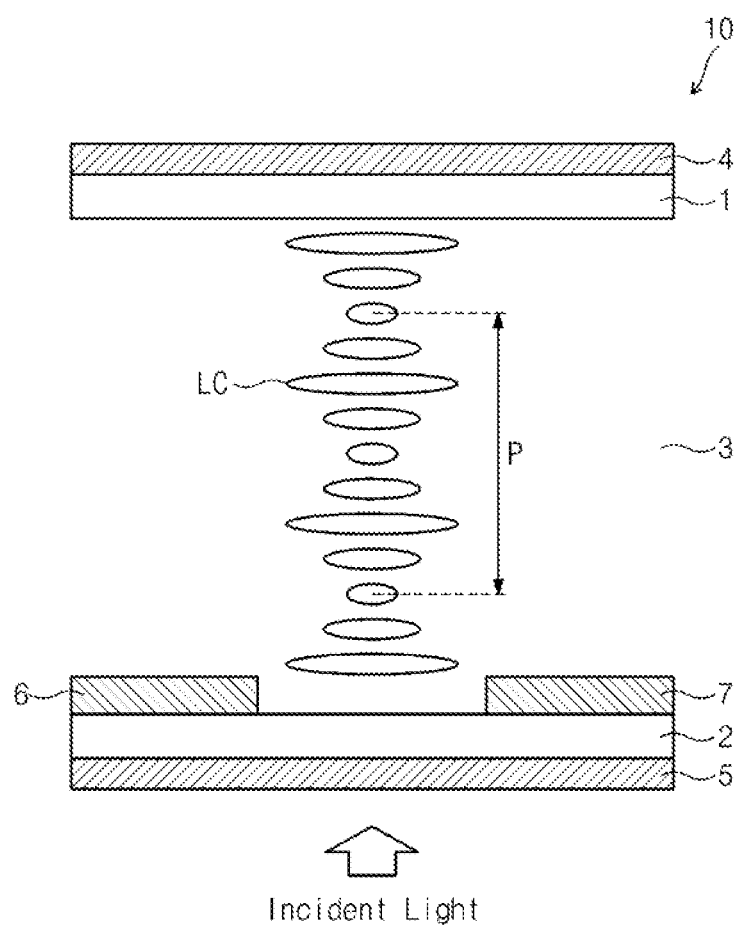
FIGS. 1A and 1B are views showing an operation principle of a display panel according to an exemplary embodiment of the present invention.

Exemplary embodiments of the present invention will be described more fully hereinafter with reference to the accompanying drawings. Like reference numerals refer to like elements throughout the accompanying drawings.

It will be understood that when an element or layer is referred to as being "on," "connected to" or "coupled to" another element or layer, it may be directly on, connected or coupled to the other element or layer or intervening elements or layers may be present. As used herein, the term "and/or" includes any and all combinations of one or more of the associated listed items.

Figure 1B:
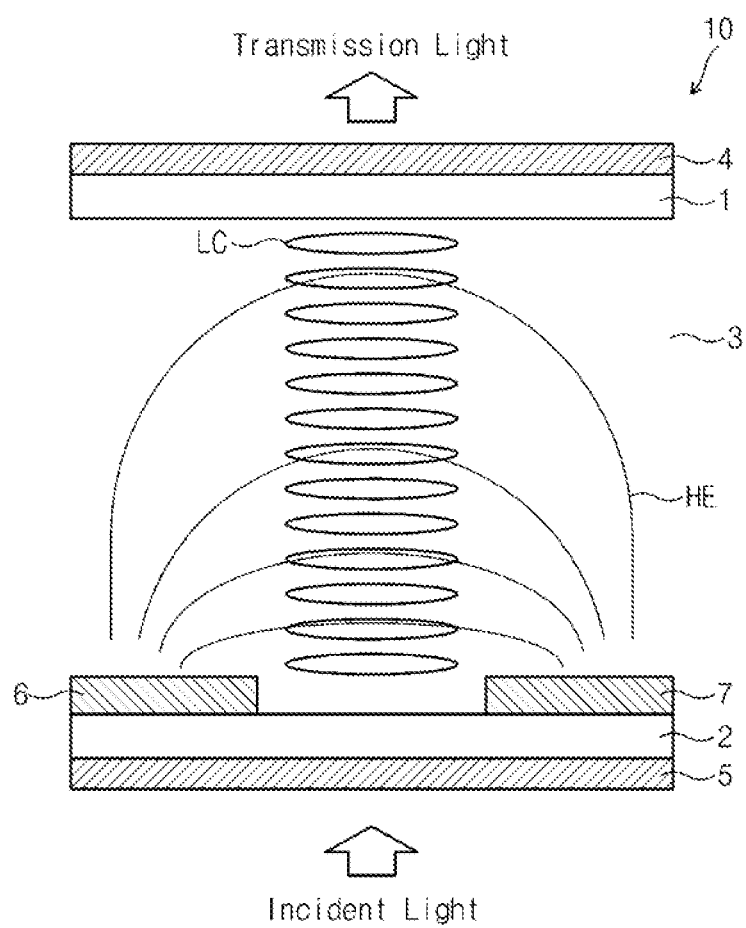

FIGS. 1A and 1B are views showing an operation principle of a display panel according to an exemplary embodiment of the present invention.

Referring to FIG. 1A, in the present exemplary embodiment, a display panel 10 includes a first substrate 1, a second substrate 2 facing the first substrate 1, a liquid crystal layer 3 disposed between the first substrate 1 and the second substrate 2, a first polarizing film 4 facing the liquid crystal layer 3 and interposing the first substrate 1 therebetween, and a second polarizing film 5 facing the liquid crystal layer 3 and interposing the second substrate 2 therebetween. An absorption axis of the first polarizing film 4 is substantially perpendicular to an absorption axis of the second polarizing film 5.

The second substrate 2 includes a first electrode 6 and a second electrode 7. The first and second electrodes 6 and 7 are spaced apart from each other, and receive different voltages from each other to generate a horizontal electric field in the liquid crystal layer 3.

The liquid crystal layer 3 includes cholesteric liquid crystals LC. Prior to the application of the electric field to the liquid crystal layer 3, the cholesteric liquid crystals LC have a spiral structure in which an axis is substantially parallel to the first and second substrates 1 and 2, and a rotation axis is substantially perpendicular to the first and second substrates 1 and 2. A, pitch P of the cholesteric liquid crystals LC—that is, a cycle of the spiral structure—is shorter than a wavelength of a visible ray, and thus the pitch P may be about 200 nm or shorter. Hereinafter, in the present exemplary embodiment, the cholesteric liquid crystals LC have a pitch of about 200 nm or shorter.

Referring to FIG. 1A, because the pitch P is shorter than the wavelength of the visible ray, and because the cholesteric liquid crystals LC are operated as an isotropic material with respect to the visible ray and the absorption axis of the first polarizing film 4 and the absorption axis of the second polarizing film 5 are substantially perpendicular to each other, a light incident from a lower portion of the second substrate 5 has no change in birefringence after the light is transmitted through the liquid crystal layer 3. Thus, the light is almost completely absorbed by the first polarizing film 4.

Referring to FIG. 1B, when the first and second electrodes 6 and 7 receive different voltages from each other and generate the horizontal electric field HE in the liquid crystal layer 3, the axis of the cholesteric liquid crystals LC is arranged substantially parallel to a direction of the horizontal electric field HE, and the spiral structure of the cholesteric liquid crystals LC is destroyed. As a result, a birefringence of the light occurs when the light incident from the lower portion of the second substrate 2 is transmitted through the cholesteric liquid crystals LC and the first substrate 1. According to the method described above, the display panel 10 may display a grayscale image.

Figure 2A:
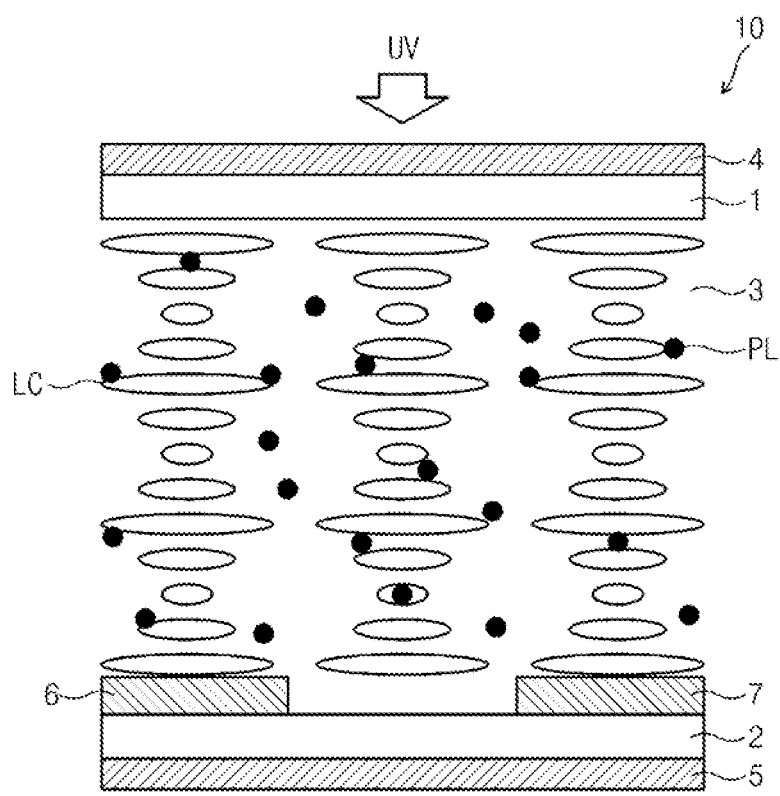
FIGS. 2A and 2B are views showing a method of manufacturing a display panel according to an exemplary embodiment of the present invention.
Figure 2B:
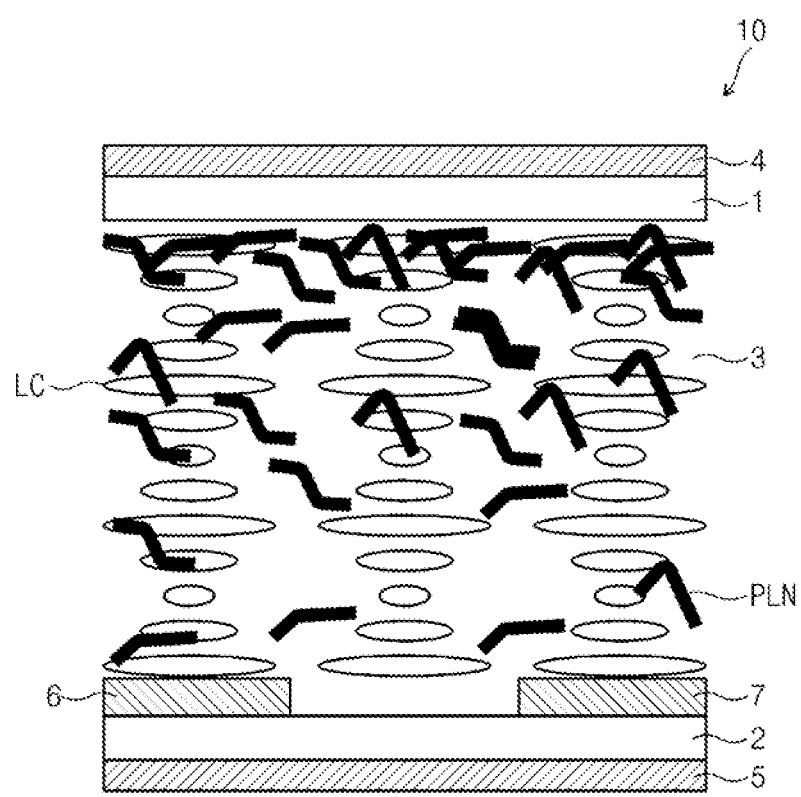

FIGS. 2A and 2B are views showing a method of manufacturing a display panel according to an exemplary embodiment of the present invention. Like reference numerals denote like elements in FIGS. 1A-1B and 2A-2B. Thus, detailed descriptions of like elements will be omitted.

Referring to FIG. 2A, the liquid crystal layer 3 is disposed between the first substrate 1 and the second substrate 2, and a polymer PL is added to the liquid crystal layer 3. The polymer PL may be added to the liquid crystal layer 3 during the formation of the liquid crystal layer 3, and is disposed between the first substrate 1 and the second substrate 2 together with the liquid crystal layer 3. A light source (not shown) emitting an ultraviolet ray UV is disposed on an upper portion of the first substrate 1. The ultraviolet ray UV is transmitted through the first substrate 1 and incident to the second substrate 2.

Referring to FIG. 2B, the polymer PL added to the liquid crystal layer 3 is exposed to the incident ultraviolet ray UV, forms a polymer network PLN with the cholesteric liquid crystals LC, and stabilizes an alignment of the liquid crystal layer 3. As shown in FIG. 2B, a concentration of the polymer network PLN is lower in an area adjacent to the second substrate 2 than a concentration of the polymer network PLN in an area adjacent to the first substrate 1.

As the concentration of the polymer network PLN in the area adjacent to the first substrate 1 increases, the concentration of the polymer network PLN in the area adjacent to the second substrate 2 decreases. When the voltage drop at the polymer network PLN arranged between the first and second electrodes 6 and 7 decreases, a minimum voltage (e.g., a critical voltage) needed to cause the axes of the cholesteric liquid crystals LC to become substantially parallel to an electric field generated by the first and second electrodes 6 and 7 is lowered. As a result, the driving voltage of the display panel 10 may be reduced.

A method of making the concentration of the polymer network PLN lower in the area adjacent to the second substrate 2 than the concentration of the polymer network PLN in the area adjacent to the first substrate 1 is described below.

Table 1 represents results obtained by measuring the driving voltage $V_{max}$ when a liquid crystal layer 3 having a thickness of about 10 μm, in which the cholesteric liquid crystal and the polymer (e.g., a reactive mesogen) are mixed with each other in a ratio of 9:1, is exposed to light having different intensity values. Each of the first and second electrodes 6 and 7 has a width of about 4 μm, a distance between the first and second electrodes 6 and 7 is about 4 μm, and a cure temperature of the reactive mesogen is maintained at about 30° C.

As shown in Table 1, the driving voltage $V_{max}$ becomes lower as the intensity of the light used to expose the reactive mesogen becomes smaller. As the intensity of the light decreases, the reactive mesogen becomes sufficiently diffused, and the reactive mesogen accumulates near the first substrate 1 where the light is incident prior to reaching the second substrate 2.

TABLE 1

| Cure temperature (C.°) | 30 | 30 | 30 |
|---|---|---|---|
| Intensity of light exposure (mW) (wavelength: 350~390 nm) | 0.1 mW/cm² | 2 mW/cm² | 11 mW/cm² |
| Driving voltage ($V_{max}$, V) | 64 | 70 | 74 |

Table 2 represents results obtained by measuring the driving voltage Vmax when the liquid crystal layer 3 having a thickness of about 10 μm, in which the cholesteric liquid crystal and the reactive mesogen are mixed with each other in a ratio of 9:1, is cured under different cure temperatures. Each of the first and second electrodes 6 and 7 has a width of about 4 μm, a distance between the first and second electrodes 6 and 7 is about 4 μm, and the intensity of the light is set to about 0.1 mW/cm² and 2 mW/cm².

As shown in Table 2, the driving voltage $V_{max}$ becomes lower as the intensity of the light used to expose the reactive mesogen becomes smaller. When applying light having the same intensity, the driving voltage $V_{max}$ becomes lower as the cure temperature of the reactive mesogen becomes higher.

As a result, as the intensity of the light used to expose the reactive mesogen becomes lower and the cure temperature of the reactive mesogen becomes higher, the reactive mesogen may be sufficiently diffused, and thus, the reactive mesogen accumulates near the first substrate 1 where the light is incident prior to reaching the second substrate 2.

TABLE 2

| Cure temperature (C.°) | 30 | 45 | 30 | 45 |
|---|---|---|---|---|
| Intensity of light exposure (mW) (wavelength: 350~390 nm) | 2 mW/cm² | 2 mW/cm² | 0.1 mW/cm² | 0.1 mW/cm² |
| Driving voltage ($V_{max}$, V) | 70 | 60 | 64 | 56 |

Table 3 represents results obtained by measuring the driving voltage $V_{max}$ when a predetermined voltage is applied between the first and second electrodes 6 and 7 and the liquid crystal layer is formed by mixing the cholesteric liquid crystal and the reactive mesogen in a ratio of 9:1. In this case, each of the first and second electrodes 6 and 7 has a width of about 4 μm, a distance between the first and second electrodes 6 and 7 is about 4 μm, the intensity of the light is set to about 2 mW/cm², and the cure temperature of the reactive mesogen is maintained at about 30° C.

As shown in Table 3, the driving voltage $V_{max}$ becomes lower as the voltage applied between the first and second electrodes 6 and 7 becomes higher. As the voltage applied between the first and second electrodes 6 and 7 increases, the polymer network PLN is formed and the twisted structure of the cholesteric liquid crystal is loosened when the polymer is exposed to the light. Thus, the driving voltage $V_{max}$ decreases.

TABLE 3

| Cure temperature (C.°) | 30 | 30 | 30 | 30 |
|---|---|---|---|---|
| Intensity of light exposure (mW) (wavelength: 350~390 nm) | 2 mW/cm² | 2 mW/cm² | 2 mW/cm² | 2 mW/cm² |
| Thickness of the liquid crystal layer (μm) | 10 | 10 | 5 | 5 |
| Voltage applied between the first and second substrates | 0 | 7 | 0 | 13 |
| Driving voltage ($V_{max}$, V) | 70 | 66 | 70 | 68 |

Figure 3A:
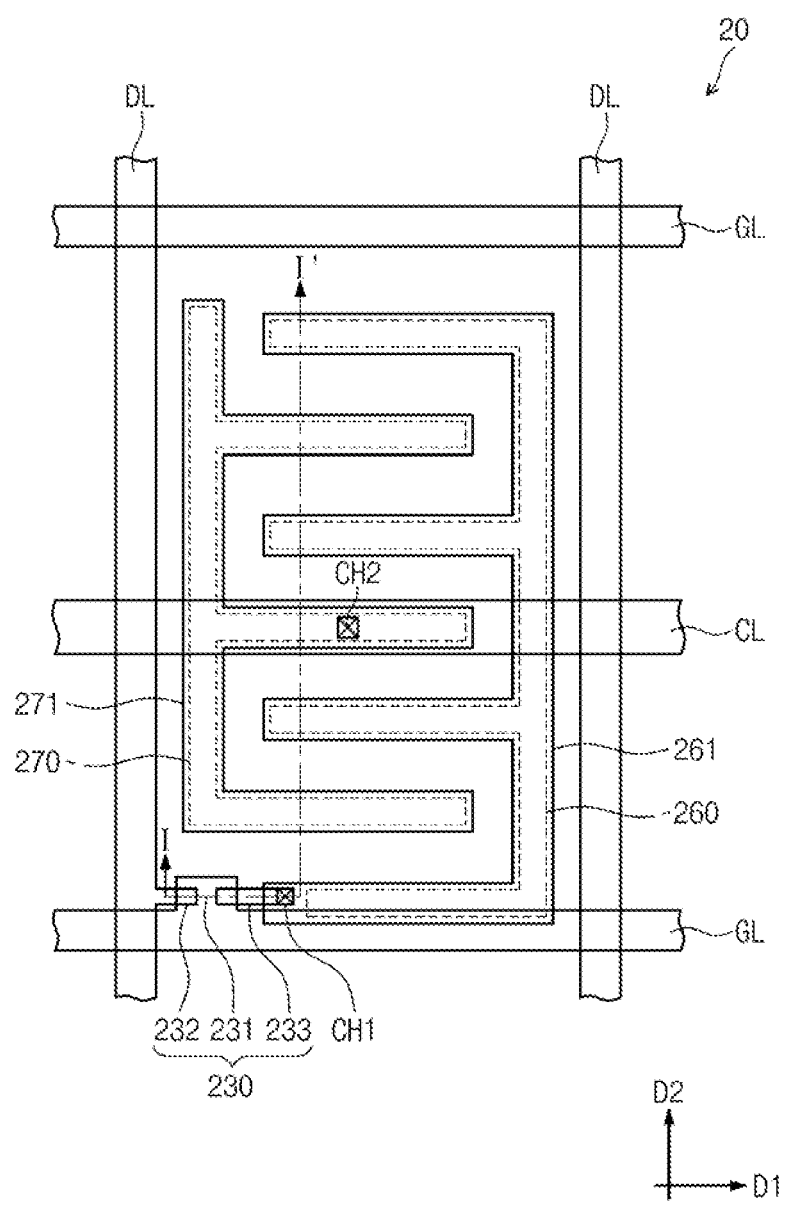
FIG. 3A is a plan view showing a display panel according to an exemplary embodiment of the present invention.
Figure 3B:
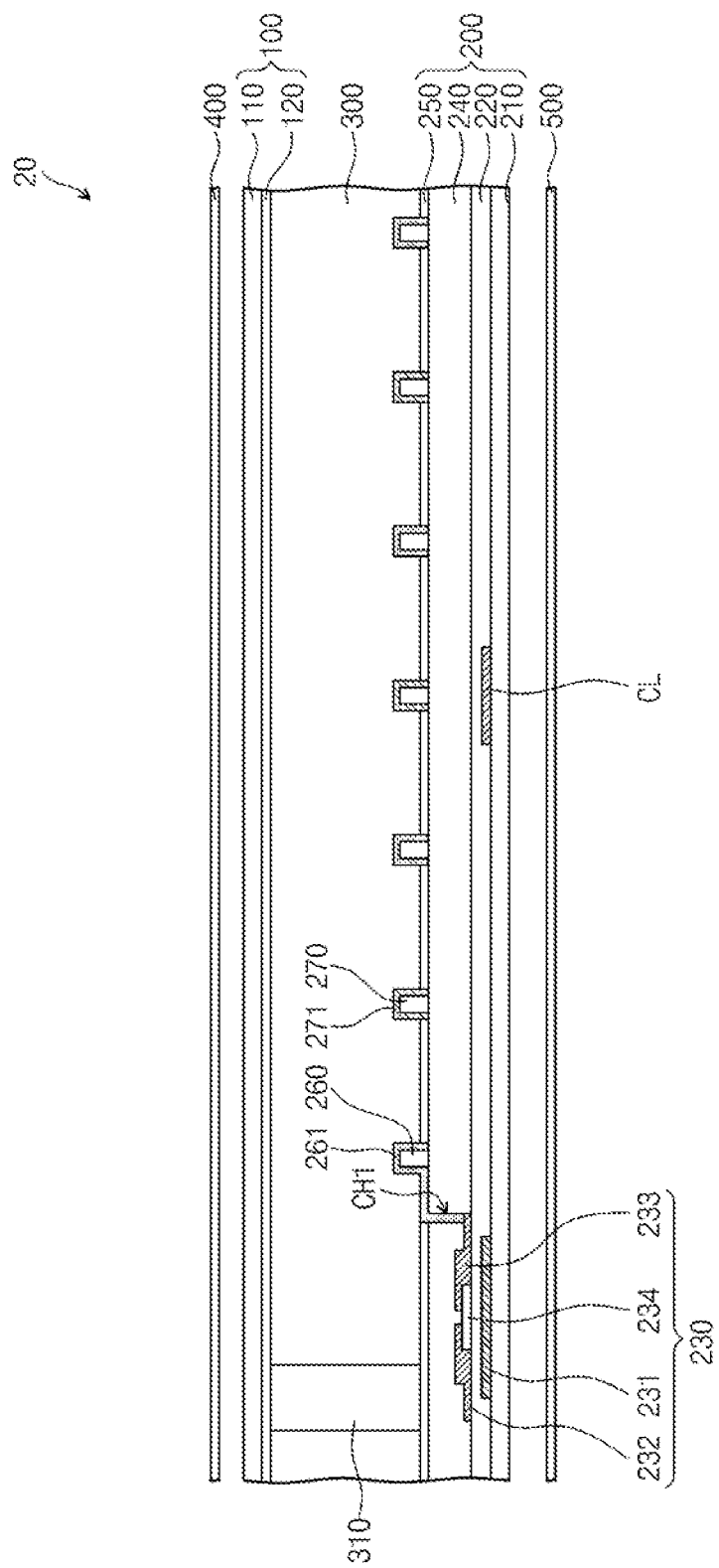
FIG. 3B is a cross-sectional view taken along a line I-I' of FIG. 3A.

FIG. 3A is a plan view showing a display panel according to an exemplary embodiment of the present invention. FIG. 3B is a cross-sectional view taken along a line I-I' of FIG. 3A.

Referring to FIG. 3A, a display panel 20 includes a gate line GL extending in a first direction D1, a data line DL extending in a second direction D2 and crossing the gate line GL, a common line CL spaced apart from the gate line GL and extending in the first direction D1, a thin film transistor 230 connected to the gate line GL, a first electrode 261, and a second electrode 271.

The thin film transistor 230 includes a gate electrode 231 branched from the gate line GL, a source electrode 232 insulated from the gate electrode 231 and branched from the data line DL, and a drain electrode 233 spaced apart from the source electrode 232.

The first electrode 261 is connected to the drain electrode 233 through a first contact hole CH1, and the second electrode 271 is connected to the common line CL through a second contact hole CH2.

Referring to FIG. 3B, the display panel 20 includes a first substrate 100, a second substrate 200 facing the first substrate 100, and a liquid crystal layer 300 disposed between the first and second substrates 100 and 200. The liquid crystal layer 300 may include a cholesteric liquid crystal having a pitch that is shorter than a wavelength of a visible ray.

The first substrate 100 includes a first base substrate 110 and a first alignment layer 120 disposed under the first base substrate 110. The first substrate 100 may include color filters such as, for example, a red color filter, a green color filter, and a blue color filter.

The second substrate 200 includes a second base substrate 210 and a gate insulating layer 220 arranged on the second base substrate 210 to cover the gate electrode 231. The source and drain electrodes 232 and 233 are arranged on the gate insulating layer 220. A semiconductor layer 234 is disposed between the gate electrode 231 and the source electrode 232, and between the gate electrode 231 and the drain electrode 233. An organic protective layer 240 is arranged on the thin film transistor 230.

A second alignment layer 250 is arranged on the organic protective layer 240 and aligns the cholesteric liquid crystals LC. A rubbing direction of the first alignment layer 120 may be opposite to a rubbing direction of the second alignment layer 250.

A first protruding portion 260 is disposed on the organic protective layer 240 in an area corresponding to the first electrode 261, and a second protruding portion 270 is disposed on the organic protective layer 240 in an area corresponding to the second electrode 271. The first and second protruding portions 260 and 270 may be, for example, an organic material.

Since the first and second electrodes 261 and 271 are formed on the first and second protruding portions 260 and 270, respectively, the driving voltage of the display panel 20 may be lowered. In addition, an electric field having a substantially horizontal formation is formed in the liquid crystal layer 300 to improve a display characteristic, thereby stabilizing a phase of the liquid crystal layer 300.

A column spacer 310 is disposed between the first and second substrates 100 and 200 and uniformly maintains a distance between the first and second substrates 100 and 200.

The display panel 20 further includes a first optical film 400 disposed on the first substrate 100 and a second optical film 500 disposed under the second substrate 200. The first optical film 400 may include a first polarizing film and the second optical film 500 may include a second polarizing film. An absorption axis of the first polarizing film 400 is substantially perpendicular to an absorption axis of the second polarizing film 500, and the absorption axes of the first and second polarizing films may form an angle of about 45 degrees with respect to the rubbing direction of the first alignment layer 120. The first and second optical films 400 and 500 are described in more detail below.

Figure 4A:
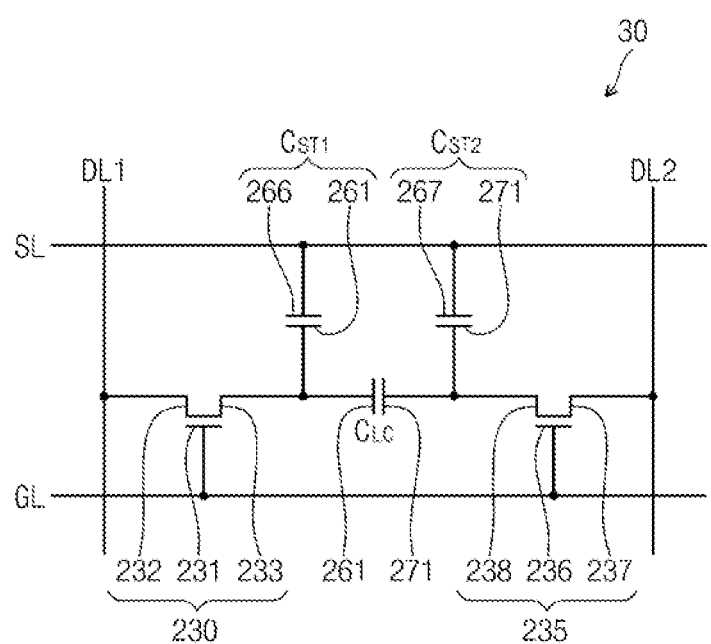
FIG. 4A is a circuit diagram showing a display panel according to an exemplary embodiment of the present invention.
Figure 4B:
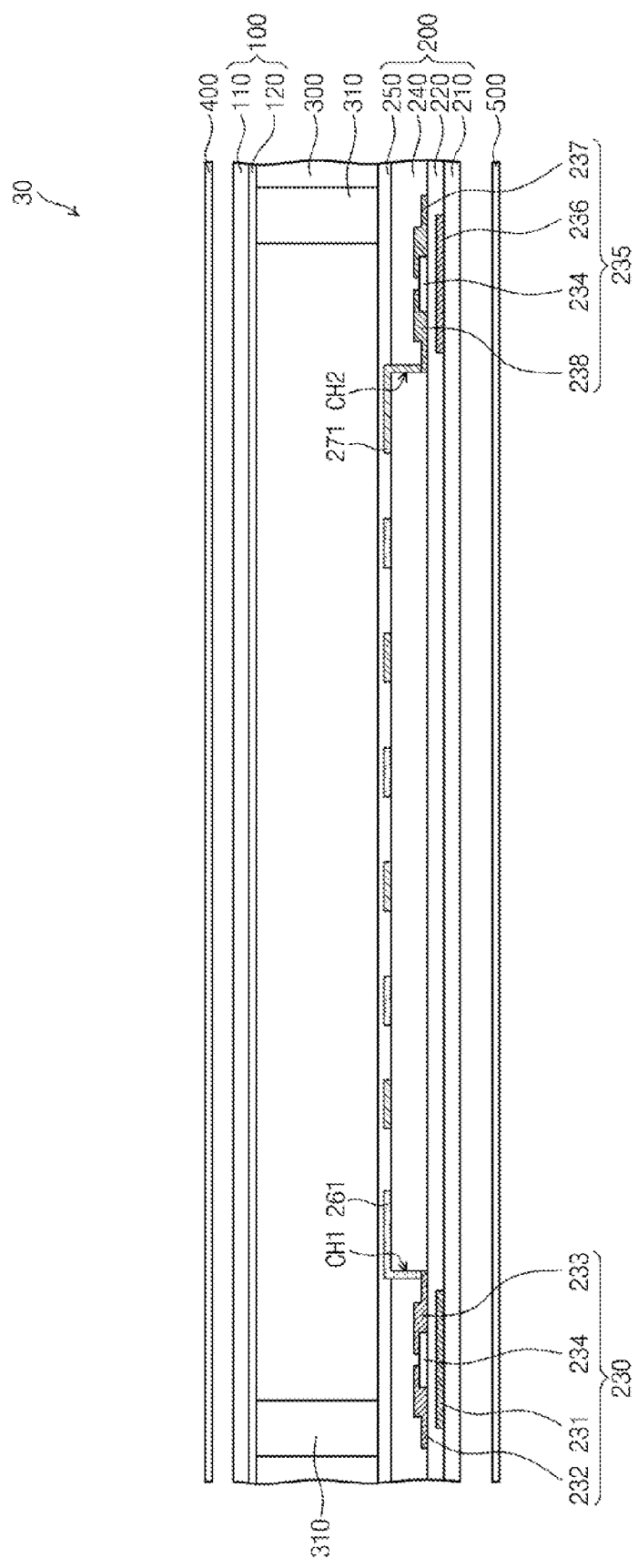
FIG. 4B is a cross-sectional view showing a display panel corresponding to the circuit diagram of FIG. 4A.
Figure 4C:
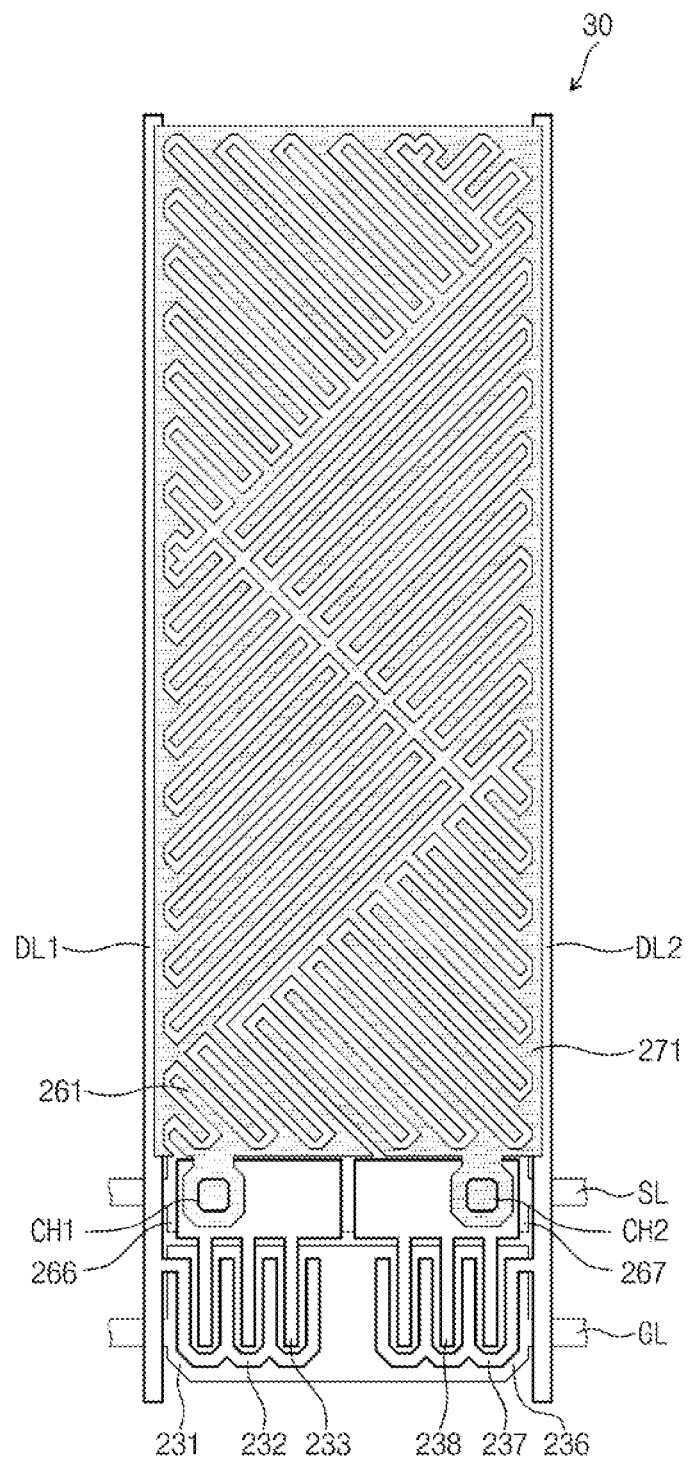
FIG. 4C is a plan view showing a display panel corresponding to the cross-sectional view of FIG. 4B.

FIG. 4A is a circuit diagram showing a display panel according to an exemplary embodiment of the present invention. FIG. 4B is a cross-sectional view showing a display panel corresponding to the circuit diagram of FIG. 4A. FIG. 4C is a plan view showing a display panel corresponding to the cross-sectional view of FIG. 4B. Like reference numerals denote like elements in FIGS. 1A-3B and FIGS. 4A-4C. Thus, detailed descriptions of like elements will be omitted.

Referring to FIG. 4A, a display panel 30 includes a first data line DL1 and a second data line DL2 arranged substantially parallel to each other, a gate line GL insulated from the first and second data lines DL1 and DL2 and crossing the first and second data lines DL1 and DL2, a first thin film transistor 230 connected to the first data line DL1 and the gate line GL, and a second thin film transistor 235 connected to the second data line DL2 and the gate line GL.

The first thin film transistor 230 includes a first gate electrode 231 branched from the gate line GL, a first source electrode 232 branched from the first data line DL1, and a first drain electrode 233 spaced apart from the first source electrode 232. The second thin film transistor 235 includes a second gate electrode 236 branched from the gate line GL, a second source electrode 237 branched from the second data line DL2, and a second drain electrode 238 spaced apart from the second source electrode 237.

The display panel 30 further includes a first electrode 261 connected to the first drain electrode 233 and a second electrode 271 connected to the second drain electrode 238. The first and second electrodes 261 and 271 form a liquid crystal capacitor $C_{LC}$, and the display panel 30 displays a grayscale image in response to an electric field generated between the first and second electrodes 261 and 271. The first and second electrodes 261 and 271 receive voltages having different polarities from each other. As a result, the driving voltage of the cholesteric liquid crystal may be substantially lowered.

The display panel 30 may further include a storage line SL that is arranged substantially parallel to the gate line GL, a first storage electrode 266 branched from the storage line SL, and a second storage electrode 267 branched from the storage line SL. The first storage electrode 266 and the first electrode 261 generate an electric field and form a first storage capacitor $C_{ST1}$. The second storage electrode 267 and the second electrode 271 generate an electric field and form a second storage capacitor $C_{ST2}$. The first and second storage capacitors $C_{ST1}$ and $C_{ST2}$ uniformly maintain a voltage level of the liquid crystal capacitor $C_{LC}$ for a certain period of time.

Although not shown in FIGS. 4A and 4B, the first electrode 261 may form a capacitor with the first data line DL1 and the second electrode 271 may form a capacitor with the second data line DL2 in order to reduce a kickback voltage generated by the first and second thin film transistors 230 and 235. Similarly, each of the first and second electrodes 261 and 271 may faun a capacitor with the second data line DL2.

Referring to FIG. 4B, the display panel 30 includes a first substrate 100, a second substrate 200 facing the first substrate 100, and a liquid crystal layer 300 disposed between the first and second substrates 100 and 200. The liquid crystal layer 300 may include a cholesteric liquid crystal having a pitch that is shorter than a wavelength of a visible ray.

The first substrate 100 includes a first base substrate 110 and a first alignment layer 120 disposed under the first base substrate 110. The first substrate 100 may include color filters such as, for example, a red color filter, a green color filter, and a blue color filter.

The first electrode 261 is connected to the first drain electrode 233 through a first contact hole CH1 and the second electrode 271 is connected to the second drain electrode 238 through a second contact hole CH2. The first and second electrodes 261 and 271 may function as pixel electrodes.

Referring to FIG. 4C, each of the first and second electrodes 261 and 271 extends in a branch shape, and the extended portions in the branch shape in each of the first and second electrodes 261 and 271 are alternately arranged to engage each other. The engaged portions of the first and second electrodes 261 and 271 inclinedly extend with respect to a direction in which the first and second data lines DL1 and DL2 extend. Thus, an electric field generated between the first and second pixel electrodes 261 and 271 is formed inclinedly with respect to the direction in which the first and second data lines DL1 and DL2 extend. It is to be appreciated that the shape of the first and second electrodes 261 and 271 is not limited thereto, and the first and second electrodes 261 and 271 may have various shapes.

The second substrate 200 includes a second base substrate 210, the first and second gate electrodes 231 and 236, a gate insulating layer 220 arranged on the second base substrate 210, and the first and second gate electrodes 231 and 236. The first and second source electrodes 232 and 237 and the first and second drain electrodes 233 and 238 are arranged on the gate insulating layer 220. An organic protective layer 240 is arranged on the gate insulating layer 220 and covers the first and second thin film transistors 230 and 235.

A second alignment layer 250 is arranged on the organic protective layer 240 and aligns the cholesteric liquid crystals LC. A rubbing direction of the first alignment layer 120 may be opposite to a rubbing direction of the second alignment layer 250.

The display panel 30 further includes a first optical film 400 disposed on the first substrate 100 and a second optical film 500 disposed under the second substrate 200. The first optical film 400 may include a first polarizing film, and the second optical film 500 may include a second polarizing film. An absorption axis of the first polarizing film is substantially perpendicular to an absorption axis of the second polarizing film, and the absorption axes of the first and second polarizing films may form an angle of about 45 degrees with respect to the rubbing direction of the first alignment layer 120. The first and second optical films 400 and 500 are described in more detail below.

Figure 5:
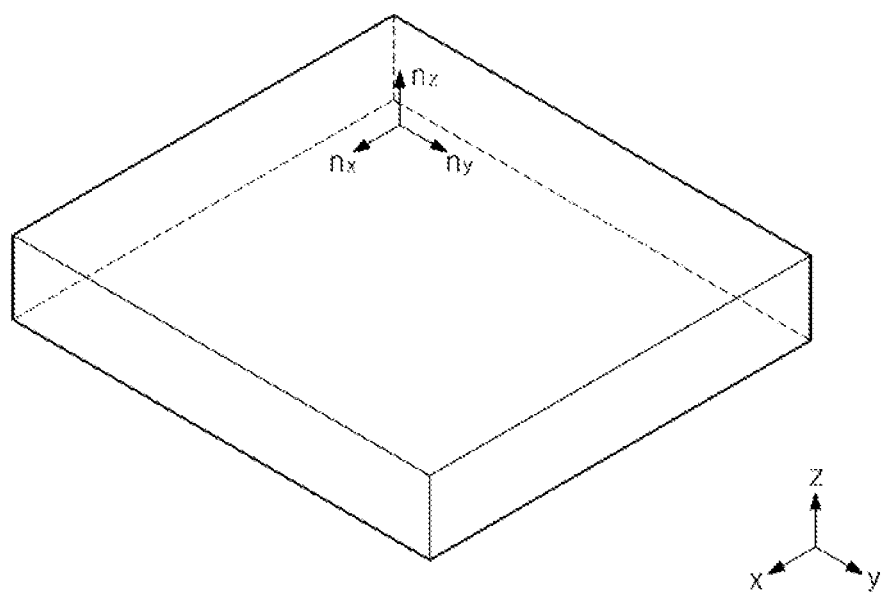
FIG. 5 is a perspective view showing a phase difference film according to an exemplary embodiment of the present invention.

FIG. 5 is a perspective view showing a phase difference film according to an exemplary embodiment of the present invention.

The first and second optical films 400 and 500 may include a phase difference film to compensate for a phase difference, which occurs in the liquid crystal layer 300 or the polarizing film, in an opposite direction. The phase difference film may be classified into an A-plate, a C-plate, or a biaxial film according to its refractive-index anisotropy.

Referring to FIG. 5, a material through which a light transmits has refractive indices $n_x$, $n_y$, and $n_z$ in three directions (e.g., an x-axis direction, a y-axis direction, and a z-axis direction). An isotropy exists when the refractive indices in all three directions are the same, and an anisotropy exists when the refractive indices in all three directions—or parts of the three directions—are different. When the material has a film shape, a thickness direction of the film is referred to as the z-axis direction, a surface direction of the film is referred to as the x-axis direction, and a direction that is substantially perpendicular to the x-axis direction is referred to as the y-axis direction.

A uniaxial film exists when two directions of the x-axis direction, the y-axis direction, and the z-axis direction have the same refractive index, and the remaining one direction of the x-axis direction, the y-axis direction, and the z-axis direction has a different refractive index from the other two directions. A biaxial film exists when all three directions of the x-axis direction, the y-axis direction, and the z-axis direction have different refractive indices from each other.

In the uniaxial film, the A-plate exists when the surface direction has a different refractive index from the other directions. The A-plate is divided into a positive A-plate, in which the refractive index of the x-axis direction is larger than that of the y-axis direction, and a negative A-plate, in which the refractive index of the x-axis direction is smaller than that of the y-axis direction.

The C-plate exists when the thickness direction has a different refractive index from the others directions. The C-plate is divided into a positive C-plate, in which the refractive index of the z-axis direction is larger than that of the x-axis direction and the y-axis direction, and a negative C-plate, in which the refractive index of the z-axis direction is smaller than that of the x-axis direction and the y-axis direction.

A phase difference value R of the uniaxial film is defined as follow:

$$R = d \times \Delta n = d \times (n_e - n_o) \quad \text{Equation 1}$$

In Equation 1, d represents a thickness of a plate, $n_e$ represents an extraordinary refractive index, and $n_o$ represents an ordinary refractive index.

In the biaxial film, the phase difference exists in the thickness and surface directions. The biaxial film is divided into a positive biaxial film, in which the refractive index of the z-axis direction is larger than that of the x-axis direction and the y-axis direction, and a negative biaxial film, in which the refractive index in the z-axis direction is smaller than that of the x-axis direction and the y-axis direction.

The phase difference value $R_{in}$ in the surface direction of the biaxial film, and the phase difference value $R_{th}$ in the thickness direction of the biaxial film, are defined by Equations 2 and 3:

$$R_{in} = d \times (n_x - n_y) \quad \text{Equation 2}$$

In Equation 2, d represents a thickness of a film, $n_x$ represents the refractive index in the x-axis direction, and $n_y$ represents the refractive index in the y-axis direction.

$$R_{th} = d \times (n_z - n_y) \quad \text{Equation 3}$$

In Equation 3, d represents a thickness of a film, $n_z$ represents the refractive index in the z-axis direction, and $n_y$ represents the refractive index in the y-axis direction.

A phase difference value $R_{LC}$ of the liquid crystal layer 300 is defined by Equation 4:

$$R_{LC} = d_{LC} \times (n_{x,LC} - n_{y,LC})$$

In Equation 4, $d_{LC}$ represents a thickness of the liquid crystal layer, $n_{x,LC}$ represents the refractive index in the x-axis direction of the liquid crystal layer, and $n_{y,LC}$ represents the refractive index in the y-axis direction of the liquid crystal layer.

FIGS. 6A to 6G are cross-sectional views showing the first optical film 400, the liquid crystal layer 300, and the second optical film 500 shown in FIGS. 3B and 4B.

Figure 6A:
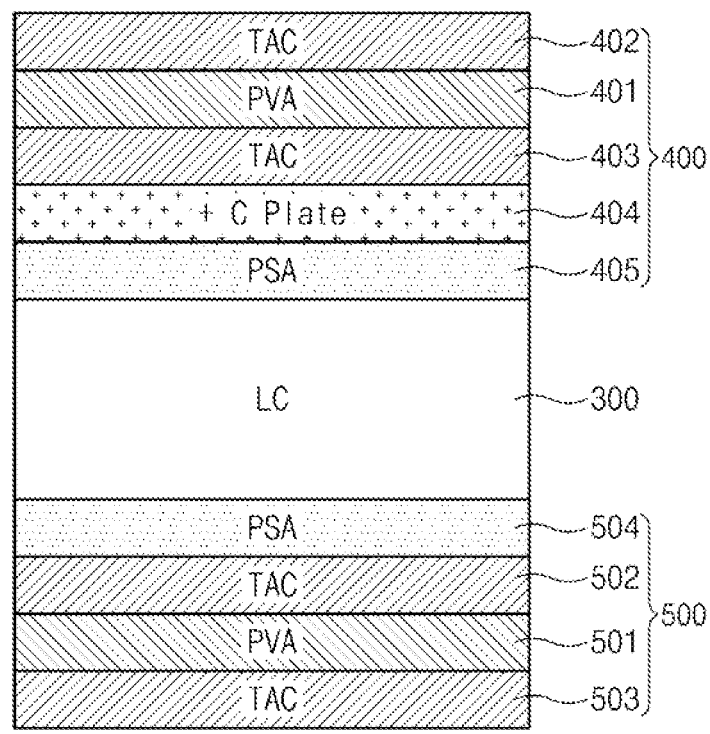
FIGS. 6A to 6G are cross-sectional views showing a first optical film, a liquid crystal layer, and a second optical film shown in FIGS. 3B and 4B.

Referring to FIG. 6A, the first optical film 400 arranged on the first substrate 100 includes a first polarizing film 401 that linearly polarizes a light transmitting through the liquid crystal layer 300 such as, for example, a polyvinyl alcohol (PVA) film. A first protective film 402 and a second protective film 403 such as, for example, a triacetyl cellulose (TAC) film, are respectively arranged on and under the first polarizing film 401 to protect and support the first polarizing film 401. A first positive C-plate 404 is arranged under the second protective film 403, and a first bonding layer 405 is arranged under the first positive C-plate 404 to bond the first optical film 400 and the first substrate 100. In the present exemplary embodiment, the positive C-plate 404 may have a phase difference value of about 100 nm to about 10,000 nm. Since an optical influence of the first and second substrates 100 and 200 becomes small when compared with that of the liquid crystal layer 300 and the first and second optical films 400 and 500, the first and second substrates 100 and 200 have been omitted in FIGS. 6A to 6G.

The second optical film 500 arranged under the second substrate 200 includes a second polarizing film 501 such as, for example, a PVA film, that linearly polarizes a light transmitting through the liquid crystal layer 300. An absorption axis of the first polarizing film 401 is substantially perpendicular to an absorption axis of the second polarizing film 501. A third protective film 502 and a fourth protective film 503 such as, for example, a TAC film, are respectively arranged on and under the second polarizing film 501 to protect the second polarizing film 501. A second bonding layer 504 is arranged on the third protective film 502 and bonds the second optical film 500 and the second substrate 200.

Since the cholesteric liquid crystals LC having the short pitch in the liquid crystal layer 300 perform a similar function as the negative C-plate, light leakage occurs at an angle of about 45 degrees with respect to the absorption axis of the first and second polarizing films 401 and 501. Thus, the display panel employing the cholesteric liquid crystals LC has a narrow viewing angle. The first positive C-plate 404 included in the first optical film 400 compensates for the phase difference occurring in the liquid crystal layer 300, and thus widens the viewing angle of the display panel.

As a result of the decrease of the phase difference in the liquid crystal layer 300 due to heat generated while the display panel is operated, the phase difference of the liquid crystal layer 300 may be substantially the same as the phase difference of the first positive C-plate 404, and the phase difference of the first positive C-plate 404 may be smaller than or substantially the same as the phase difference of the liquid crystal layer 300. In an exemplary embodiment, the first positive C-plate 404 may be included in the second optical film 500.

The optical film is described in more detail below. Like reference numerals denote like elements in FIG. 6A and FIGS. 6B-6G. Thus, detailed descriptions of like elements will be omitted.

Figure 6B:
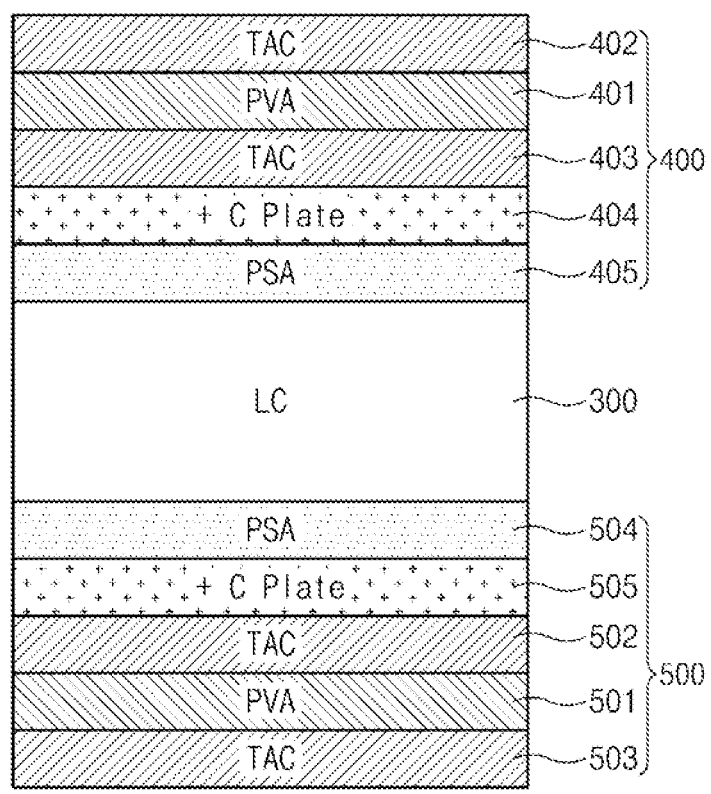

Referring to FIG. 6B, the second optical film 500 further includes a second positive C-plate 505. In addition to the first positive C-plate 404, the second positive C-plate 505 further compensates for the phase difference occurring in the liquid crystal layer 300 when the liquid crystal layer 300 has a large thickness. A sum of the phase difference values of the first and second positive C-plates 404 and 505 may be smaller than or substantially the same as phase difference value of the liquid crystal layer 300.

Figure 6C:
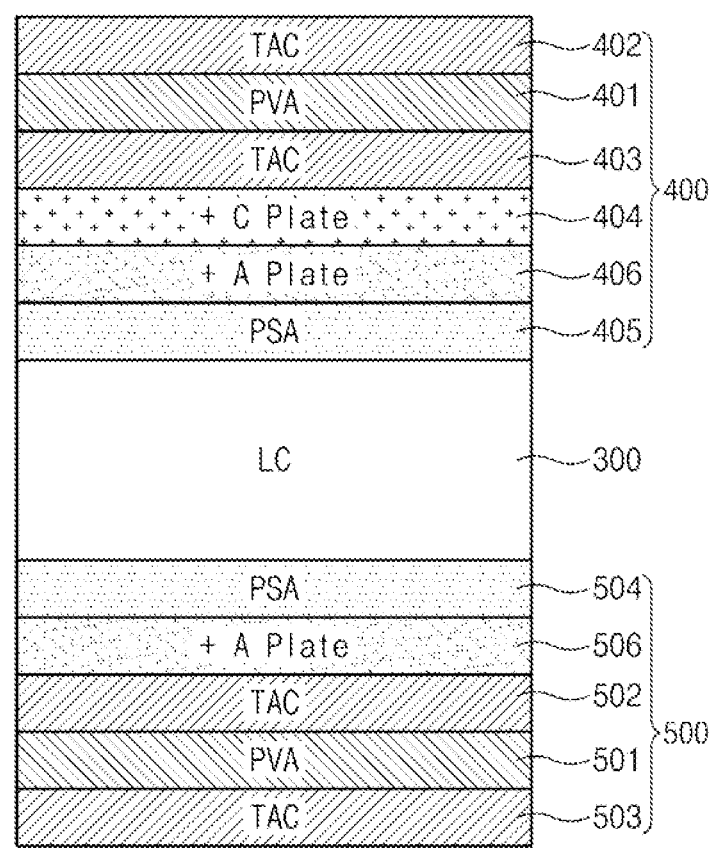

Referring to FIG. 6C, the first optical film 400 further includes a first positive A-plate 406 disposed between the first positive C-plate 404 and the first bonding layer 405. In the present exemplary embodiment, the first positive A-plate 406 may have a phase difference value of about 20 nm to about 10,000 nm. A slow axis of the first positive A-plate 406 is arranged substantially parallel to the absorption axis of the first polarizing film 401, thereby improving a contrast ratio in the absorption axis direction of the first polarizing film 401.

The second optical film 500 includes a second positive A-plate 506 disposed between the third protective film 502 and the second bonding layer 504. A slow axis of the second positive A-plate 506 is arranged substantially parallel to the absorption axis of the second polarizing film 501, thereby improving a contrast ratio in the absorption axis direction of the second polarizing film 501.

A sum of the phase difference values of the first positive C-plate 404, the first positive A-plate 406, and the second positive A-plate 506 may be substantially equal to or smaller than the phase difference value of the liquid crystal layer 300. The phase difference plates included in the first and second optical films 400 and 500 may be interchanged.

Figure 6D:
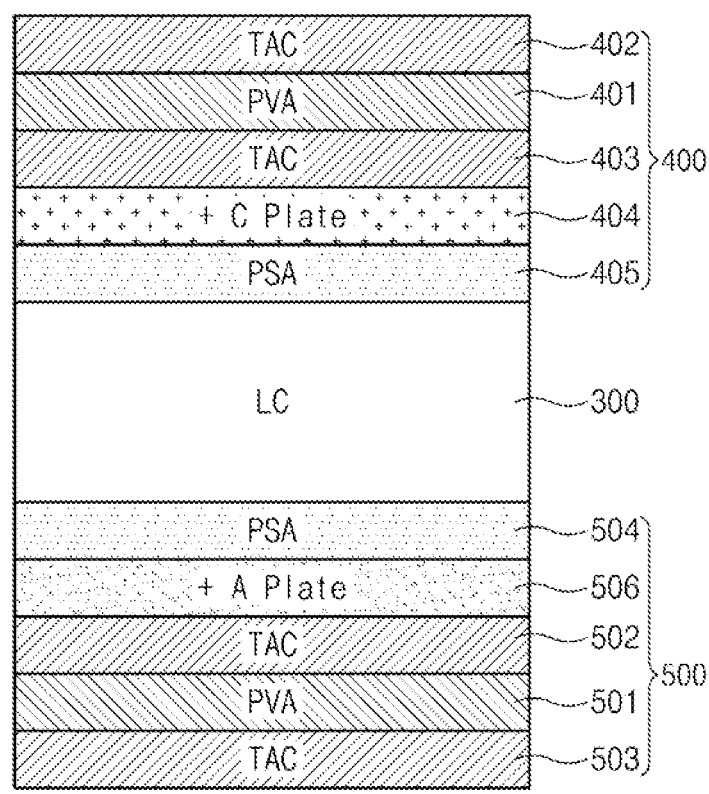

Referring to FIG. 6D, the first optical film 400 includes the first positive C-plate 404 disposed between the second protective film 403 and the first bonding layer 405, and the second optical film 500 includes the second positive A-plate 506 disposed between the third protective film 502 and the second bonding layer 504. A slow axis of the second positive A-plate 506 is arranged substantially parallel to the absorption axis of the first polarizing film 401, thereby improving a contrast ratio in the absorption axis direction of the first polarizing film 401. A sum of the phase difference values of the first positive C-plate 404 and the second positive A-plate 506 may be substantially equal to or smaller than the phase difference value of the liquid crystal layer 300. The phase difference plates included in the first and second optical films 400 and 500 may be interchanged.

Figure 6E:
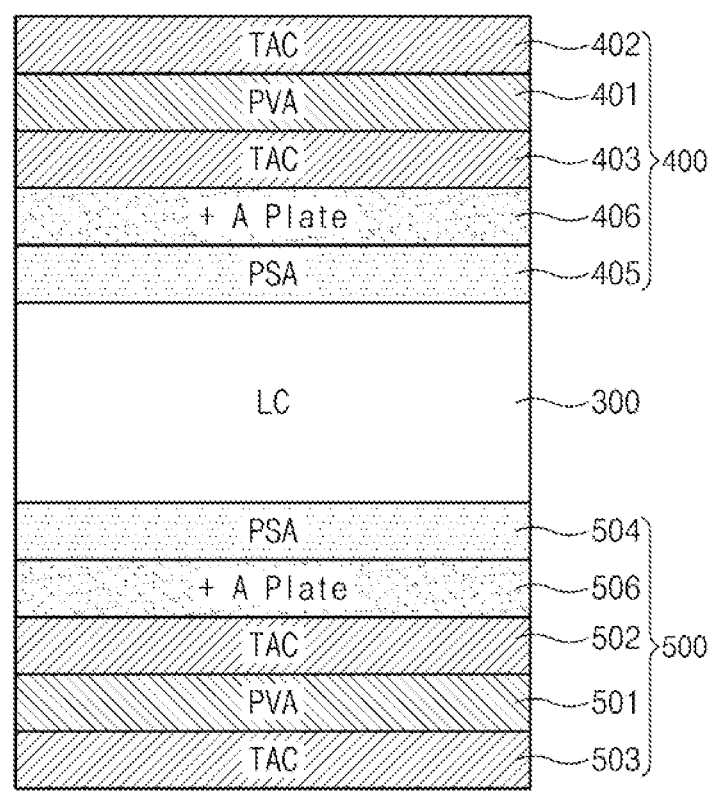

Referring to FIG. 6E, the first optical film 400 includes a first positive A-plate 406 disposed between the second protective film 403 and the first bonding layer 405, and the second optical film 500 includes a second positive A-plate 506 disposed between the third protective film 502 and the second bonding layer 504. A slow axis of each of the first and second positive A-plates 406 and 506 is arranged substantially parallel to the absorption axis of the first polarizing film 401, thereby improving a contrast ratio in the absorption axis direction of the first polarizing film 401. A sum of the phase difference values of the first and second positive A-plates 406 and 506 may be substantially equal to or smaller than the phase difference value of the liquid crystal layer 300.

Figure 6F:
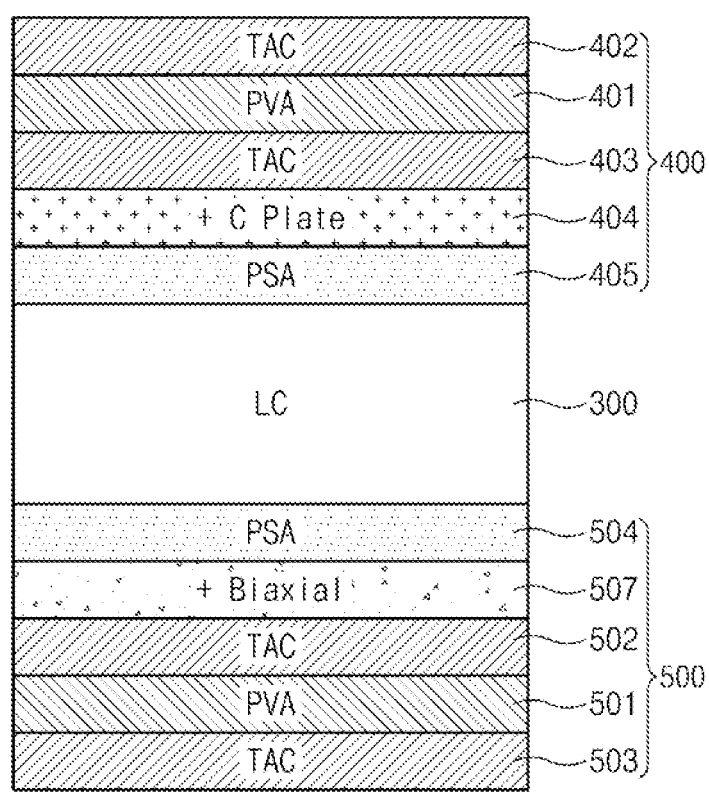

Referring to FIG. 6F, the first optical film 400 includes the first positive C-plate 404 disposed between the second protective film 403 and the first bonding layer 405, and the second optical film 500 includes a positive biaxial film 507 disposed between the third protective layer 502 and the second bonding layer 504. In the present exemplary embodiment, the positive biaxial film may have a surface direction phase difference value of about 20 nm to about 500 nm, and a thickness direction phase difference value of about 100 nm to about 1,000 nm. A slow axis of the positive biaxial film 507 is substantially parallel to the absorption axis of the first polarizing film 401 to compensate for the phase difference of the liquid crystal layer 300 and to improve a contrast ratio in the absorption axis direction of the first polarizing film 401. The thickness direction phase difference value of the positive biaxial film 507 may be substantially equal to or larger than the surface direction phase difference value. In an exemplary embodiment, the second optical film 500 may not include the third protective film 504.

Figure 6G:
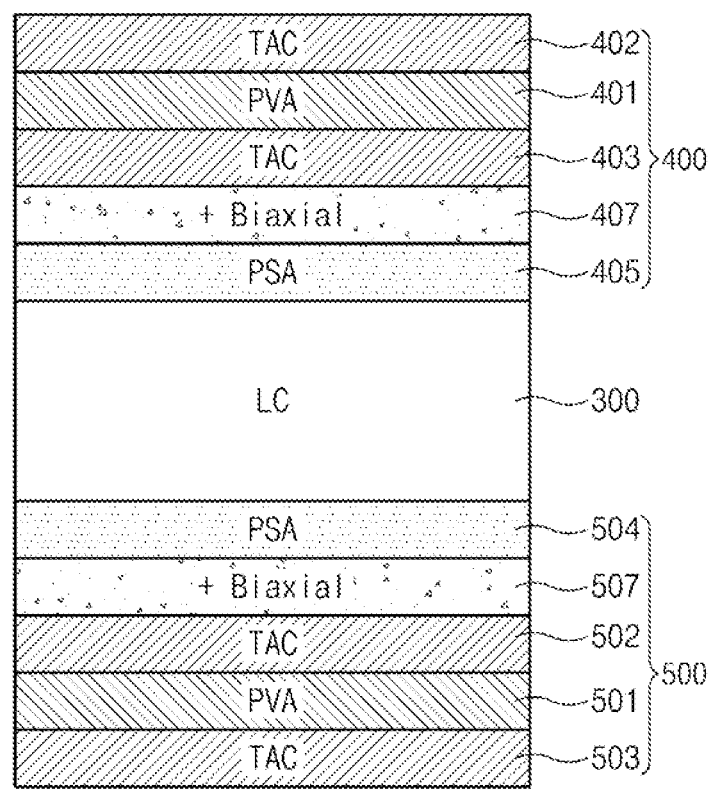

Referring to FIG. 6G, the first optical film 400 includes a first positive biaxial plate 407 disposed between the second protective film 403 and the first bonding layer 405, and the second optical film 500 includes a second positive biaxial plate 507 disposed between the third protective film 502 and the second bonding layer 504. A slow axis of the first positive biaxial plate 407 is substantially parallel to the absorption axis of the second polarizing film 501, and a slow axis of the second positive biaxial plate 507 is substantially parallel to the absorption axis of the first polarizing film 401.

The first and second positive biaxial plates 407 and 507 compensate for the phase difference of the liquid crystal layer 300 and improve a contrast ratio in the absorption axis direction of the first and second polarizing films 401 and 501.

The thickness direction phase difference of the first positive biaxial plate 407 may be substantially the same as the thickness direction phase difference of the second positive biaxial plate 507, and the surface direction phase difference of the first positive biaxial plate 407 may be substantially the same as the surface direction phase difference of the second positive biaxial plate 507. In an exemplary embodiment, the first and second optical films 400 and 500 may not include the second and third protective films 403 and 502, respectively.

While the present invention has been particularly shown and described with reference to the exemplary embodiments thereof, it will be understood by those of ordinary skill in the art that various changes in form and details may be made therein without departing from the spirit and scope of the present invention as defined by the following claims.

What is claimed is:

1. A method of manufacturing a display panel, comprising:
    forming a cholesteric liquid crystal between a first substrate and a second substrate, wherein the second substrate includes first and second electrodes spaced apart from each other, and the cholesteric liquid crystal has a pitch shorter than a wavelength of a visible ray and a rotation axis substantially perpendicular to the first and second substrates;
    generating an electric field between the first and second electrodes;
    adding a polymer to the cholesteric liquid crystal; and
    controlling a concentration of the polymer in the cholesteric liquid crystal by exposing the polymer to a light,
    wherein the light is transmitted through the first substrate and is incident to the second substrate, and the concentration of the polymer is lower in an area adjacent to and extending along the second substrate than the concentration of the polymer in an area adjacent to and extending along the first substrate.

2. The method of claim 1, wherein a driving voltage of the cholesteric liquid crystal becomes lower as an intensity of the light exposed to the polymer becomes smaller.

3. The method of claim 1, wherein a driving voltage of the cholesteric liquid crystal becomes lower as a cure temperature of the polymer becomes higher.

4. The method of claim 1, further comprising applying different voltages to the first and second electrodes while the polymer is exposed to the light, wherein a driving voltage of the cholesteric liquid crystal becomes lower as a voltage difference between the voltages applied to the first and second electrodes becomes larger.

5. A display panel comprising:
    a first substrate;
    a second substrate facing the first substrate and including a first electrode and a second electrode, wherein the first and second electrodes are spaced apart from each other, and an electric field is generated between the first and second electrodes; and
    a liquid crystal layer including a cholesteric liquid crystal and a polymer,
    wherein the liquid crystal layer is disposed between the first and second substrates, and the cholesteric liquid crystal has a pitch shorter than a wavelength of a visible ray and a rotation axis that is substantially perpendicular to the first and second substrates,
    wherein a concentration of the polymer in an area adjacent to and extending along the second substrate is lower than a concentration of the polymer in an area adjacent to and extending along the first substrate.

6. The display panel of claim 5, wherein the second substrate comprises:
    a base substrate;
    a first protruding portion protruding from the base substrate towards the first substrate and into the liquid crystal layer; and
    a second protruding portion spaced apart from the first protruding portion and protruding towards the first substrate and into the liquid crystal layer,
    wherein the first electrode covers the first protruding portion and the second electrode covers the second protruding portion.

7. The display panel of claim 5, wherein the second substrate comprises:
a first data line;
a second data line arranged substantially parallel to the first data line;
a gate line insulated from the first and second data lines and crossing the first and second data lines;
a first thin film transistor including a first gate electrode branched from the gate line, a first source electrode branched from the first data line, and a first drain electrode spaced apart from the first source electrode; and
a second thin film transistor including a second gate electrode branched from the gate line, a second source electrode branched from the second data line, and a second drain electrode spaced apart from the second source electrode,
wherein the first electrode is connected to the first drain electrode, the second electrode is connected to the second drain electrode, and the first and second electrodes receive voltages having different polarities.

8. The display panel of claim 7, wherein the second substrate further comprises:
a storage line spaced apart from the gate line, insulated from the first and second data lines, and crossing the first and second data lines; and
a first storage electrode and a second storage electrode branched from the storage line,
wherein the first and second storage electrodes face each other and generate an electric field.

9. The display panel of claim 5, further comprising:
a first optical film including a first polarizing film, wherein the first optical film faces the liquid crystal layer, and the first substrate is interposed between the first optical film and the liquid crystal layer; and
a second optical film including a second polarizing film, wherein the second optical film faces the liquid crystal layer, and the second substrate is interposed between the second optical film and the liquid crystal layer,
wherein an absorption axis of the first polarizing film is substantially perpendicular to an absorption axis of the second polarizing film, and at least one of the first and second optical films includes a positive C-plate.

10. The display panel of claim 9, wherein the first optical film comprises a first positive C-plate interposed between the first polarizing film and the liquid crystal layer, the second optical film comprises a second positive C-plate interposed between the second polarizing film and the liquid crystal layer, and a phase difference value of the liquid crystal layer is larger than or equal to a sum of a phase difference value of the first positive C-plate and a phase difference value of the second positive C-plate.

11. The display panel of claim 9, wherein the first optical film further comprises a first positive A-plate interposed between the first polarizing film and the liquid crystal layer, and the second optical film further comprises a second positive A-plate interposed between the second polarizing film and the liquid crystal layer,
wherein a slow axis of the first positive A-plate is substantially parallel to the absorption axis of the first polarizing film, and a slow axis of the second positive A-plate is substantially parallel to the absorption axis of the second polarizing film.

12. The display panel of claim 11, wherein the first optical film further comprises a positive C-plate interposed between the first polarizing film and the liquid crystal layer, and the phase difference value of the liquid crystal layer is larger than or equal to a sum of a phase difference value of the positive C-plate, a phase difference value of the first positive A-plate, and a phase difference value of the second positive A-plate.

13. The display panel of claim 9, wherein the first optical film comprises the positive C-plate interposed between the first polarizing film and the liquid crystal layer, the second optical film further comprises a positive A-plate interposed between the second polarizing film and the liquid crystal layer, and a slow axis of the positive A-plate is substantially parallel to the absorption axis of the first polarizing film.

14. The display panel of claim 9, wherein the first optical film further comprises a positive A-plate interposed between the first polarizing film and the liquid crystal layer, the second optical film comprises the positive C-plate interposed between the second polarizing film and the liquid crystal layer, and a slow axis of the positive A-plate is substantially parallel to the absorption axis of the second polarizing film.

15. The display panel of claim 9, wherein the first optical film comprises the positive C-plate interposed between the first polarizing film and the liquid crystal layer, the second optical film further comprises a positive biaxial film interposed between the second polarizing film and the liquid crystal layer, and a slow axis of the positive biaxial film is substantially parallel to the absorption axis of the first polarizing film.

16. The display panel of claim 15, wherein a phase difference value of a surface direction of the positive biaxial film is smaller than or equal to a phase difference value of a thickness direction of the positive biaxial film.

17. The display panel of claim 5, further comprising:
a first optical film including a first polarizing film and a first positive A-plate,
wherein the first optical film faces the liquid crystal layer, the first substrate is interposed between the first optical film and the liquid crystal layer, and the first positive A-plate is interposed between the first polarizing film and the liquid crystal layer; and
a second optical film including a second polarizing film and a second positive A-plate,
wherein the second optical film faces the liquid crystal layer, the second substrate is interposed between the second optical film and the liquid crystal layer, and the second positive A-plate is interposed between the second polarizing film and the liquid crystal layer,
wherein an absorption axis of the first polarizing film is substantially perpendicular to an absorption axis of the second polarizing film, and a slow axis of each of the first and second positive A-plates is substantially parallel to the absorption axis of the first polarizing film.

18. The display panel of claim 5, further comprising:
a first optical film including a first polarizing film and a first positive biaxial film,
wherein the first optical film faces the liquid crystal layer, the first substrate is interposed between the first optical film and the liquid crystal layer, and the first positive biaxial film is interposed between the first polarizing film and the liquid crystal layer; and
a second optical film including a second polarizing film and a second positive biaxial film,
wherein the second optical film faces the liquid crystal layer, the second substrate is interposed between the second optical film and the liquid crystal layer, and the second positive biaxial film is interposed between the second polarizing film and the liquid crystal layer,
wherein an absorption axis of the first polarizing film is substantially perpendicular to an absorption axis of the second polarizing film, a slow axis of the first positive biaxial film is substantially parallel to the absorption axis of the second polarizing film, and a slow axis of the second positive biaxial film is substantially parallel to the absorption axis of the first polarizing film.

19. A method of manufacturing a display panel, comprising:
   forming a liquid crystal layer between a first substrate and a second substrate, wherein the second substrate includes first and second electrodes spaced apart from each other, and the liquid crystal layer includes cholesteric liquid crystals;
   adding a polymer to the liquid crystal layer; and
   increasing a concentration of the polymer in an area adjacent to and extending along the first substrate and decreasing a concentration of the polymer in an area adjacent to and extending along the second substrate to make the concentration of the polymer in the area adjacent to and extending along the second substrate lower than the concentration of the polymer in the area adjacent to and extending along the first substrate, by increasing a voltage applied between the first and second electrodes.

20. The method of claim 19, wherein a pitch of the cholesteric liquid crystals is less than or equal to about 200 nm.

21. The method of claim 1, wherein the pitch is less than or equal to about 200 nm.

22. The display panel of claim 5, wherein the pitch is less than or equal to about 200 nm.

* * * * *